United States Patent
Vazach et al.

(10) Patent No.: US 7,319,406 B2
(45) Date of Patent: Jan. 15, 2008

(54) SYSTEM AND METHOD OF CHANNEL SERIALIZATION IN A SAFETY I/O PRODUCT

(75) Inventors: Joseph G. Vazach, Mentor, OH (US); Edward C. Hopsecger, Mentor, OH (US); Anthony G. Gibart, New Berlin, WI (US); David A. Vasko, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 265 days.

(21) Appl. No.: 11/240,714

(22) Filed: Sep. 30, 2005

(65) Prior Publication Data

US 2007/0075869 A1 Apr. 5, 2007

(51) Int. Cl.
*G08B 21/00* (2006.01)
(52) U.S. Cl. ............... 340/679; 340/680; 340/10.1; 340/10.51; 714/4; 714/7; 714/10; 714/11; 709/246; 709/249; 709/250
(58) Field of Classification Search ............... 340/679, 340/680, 10.1, 10.51; 714/4, 7, 10, 11; 709/246, 709/249, 250
See application file for complete search history.

(56) References Cited

U.S. PATENT DOCUMENTS 6,721,900 B1 * 4/2004 Lenner et al. ............... 714/4

* cited by examiner

*Primary Examiner*—Tai Nguyen
(74) *Attorney, Agent, or Firm*—Steven M. Haas; R. Scott Speroff

(57) ABSTRACT

A system serializes control signals within a safety control architecture wherein a safety serial interface at least one of receives and transmits signals from one or more processing components. A serialization component receives and serializes at least one data packet from the safety serial interface to control at least one of an input and an output associated with the safety control architecture. A safety related test circuit verifies input signals associated with the serialization component are not internally falsifying the state of the input signals. A heartbeat watchdog component verifies a true heartbeat bit in the at least one data packet is opposite a complement heartbeat bit in the at least one data packet within a predetermined time interval and shuts off power to at least one of an output and an input if such a condition is not met.

20 Claims, 8 Drawing Sheets

SYSTEM AND METHOD OF CHANNEL SERIALIZATION IN A SAFETY I/O PRODUCT

BACKGROUND

The subject invention relates to industrial controls. It finds particular application with the transmission and serialization of machine safety control signals, and will be described with particular reference thereto. However, it is to be appreciated that the present exemplary embodiment is also amenable to other like applications.

Machine control employs digital and/or analog communication to exchange information across various networks. Typically, various protocols are employed with such networks to facilitate communication between a controller(s) and one or more control components such as I/O modules, drives, servos, switches, sensors, etc. Conventional protocols accept data from a source (e.g., controller) and package the data for transmission to one or more data recipients (e.g., control components). Such protocols have limited communication and typically are suitable only for certain layers within an automation pyramid and/or limited in their functionality (e.g., single master system running a master/slave protocol). This may result in barriers within the automation architecture that are difficult to penetrate and that require complex bridging devices without being able to fully bridge the gap between the various systems that are quite different in nature.

Machine control typically includes various safety devices and associated controls that can be used to mitigate machine accidents that can harm an individual. Conventional systems typically hardwire pushbuttons (e.g., an e-stop) directly into a controller to handle emergency situations which could result in harm to an individual. In this manner, a user can shut down an operation by pressing the appropriate button. Safety signals can also be sent through various communication channels within a control system to prevent a potentially dangerous condition from occurring. Thus, maintaining the integrity of such safety signals is critical to insure that appropriate measures are taken in the event of an emergency.

A conventional safety network is designed to detect errors and react with pre-determined safe operation. Typically, this means placing the output signals in a state which would cause the machine to stop. The protocol within a safety network takes measures to ensure a high level of integrity within the application. These measures, such as message redundancy and cross-checking, ensure that safety messages are reliably transmitted from one device and received at another in a predetermined time and with the integrity of the data content maintained or that the system goes to a predetermined safety state.

In conventional machine control architectures, safety data is transmitted in a parallel fashion in order to ensure data integrity via hardware and/or software redundancy. In one example, each transmission path includes one or more isolation elements such as optical couplers, magnetic couplers, fiber optics, isolators, etc. to isolate the machines from the control systems. Such isolation elements can be unreliable and compromise data transmission and quality. In addition, each isolation element can draw additional current which leads to excess power consumption. Surplus heat can be introduced to the control system as a result of such additional current draw. Moreover, each isolation element can take up a portion of limited space available in today's solid state control devices.

Conventionally, isolation elements increase multiplicatively in relation to the number of data channels. In one example, a control system with four output channels would require eighteen isolators to maintain data integrity. In another example, a control system with sixteen output channels would require sixty-six isolators to maintain data integrity. From a design standpoint, such a large number of isolation elements can make board layout difficult, increase bus traffic, draw excessive current, increase heat, lower reliability, shorten product life, drive up system cost and compromise optimal design methodologies and system configuration.

FIG. 1 illustrates a typical industrial control system with two output channels. In this embodiment, a main microprocessing processor unit (MPU) 10 and a peer MPU 12 are employed to process data in a redundant manner. The main MPU 10 receives status and provides power and control via five data channels, (e.g., two for status, two for control, one for power) to an output component 14. At substantially the same time, the peer MPU 12 receives status and provides power and control via five different data channels to an output component 16.

Each respective data channel can be turned off by removing power from the output circuitry. The main MPU 10 can shut down 24 VDC power via a power shut off component 18. The peer MPU 12 can shut down the power via a common line through a common shut-off component 20. Data is transmitted to two output channels, a source output screw terminal 22 and a sink output screw terminal 24. The output component 14 is coupled to the source output screw terminal 22 and the output component 16 is coupled to the sink output screw terminal 24.

In order to achieve signal isolation in this conventional two channel industrial control architecture, one or more isolation elements are employed with each data channel. As shown, five isolation elements are employed with each of the processing units, 10 and 12. Thus, at least ten isolation elements are required in this control system to provide two output channels. This multiplicative ratio of output channels to isolators can have deleterious effects in design and application of the control system, as mentioned above.

What are needed are systems and methods that permit flexible machine control architecture to reliably transfer data. Eliminating the multiplicative ratio in the number of isolation elements allows flexibility to solve these application problems effectively.

BRIEF DESCRIPTION

In accordance with one aspect of the present exemplary embodiment, a system serializes control signals within a safety control architecture wherein a safety serial interface at least one of receives and transmits signals from one or more processing components. A serialization component receives and serializes at least one data packet from the safety serial interface to control at least one of an input and an output associated with the safety control architecture. A safety related test circuit verifies input signals associated with the serialization component are not internally falsifying the state of the input signals. A heartbeat watchdog component verifies a true heartbeat bit in the at least one data packet is opposite a complement heartbeat bit in the at least one data packet within a predetermined time interval and shuts off power to at least one of an output and an input if the true heartbeat bit in the data packet is not opposite a complement heartbeat bit within the predetermined time interval.

In accordance with another aspect of the present exemplary embodiment, a module serializes control signals within a safety control architecture. A safety serial interface (SSI) at least one of receives and transmits signals from one or more processing components. A logic device receives and serializes at least one data packet from the safety serial interface to control at least one of an input or an output associated with the safety control architecture. A heartbeat watchdog component verifies a true heartbeat bit in the data packet is opposite a compliment heartbeat bit in the at least one data packet.

In accordance with yet another aspect of the present exemplary embodiment, a method is employed for processing data related to the output of a serialization component. A load/store signal and a serial clock signal is set high via a first processor. Complimented data is shifted out from the first processor on the falling edge of the serial clock signal. True data is shifted out from the first processor and the true data is compared to the compliment data. The verified data is compared to an output shift register component into an output register component. A mismatch between the true and the compliment data is monitored. The compliment input data is serially transmitted followed by the true version of the data after verifying that no mismatch exists between the true and the compliment data.

DETAILED DESCRIPTION

Figure 1:
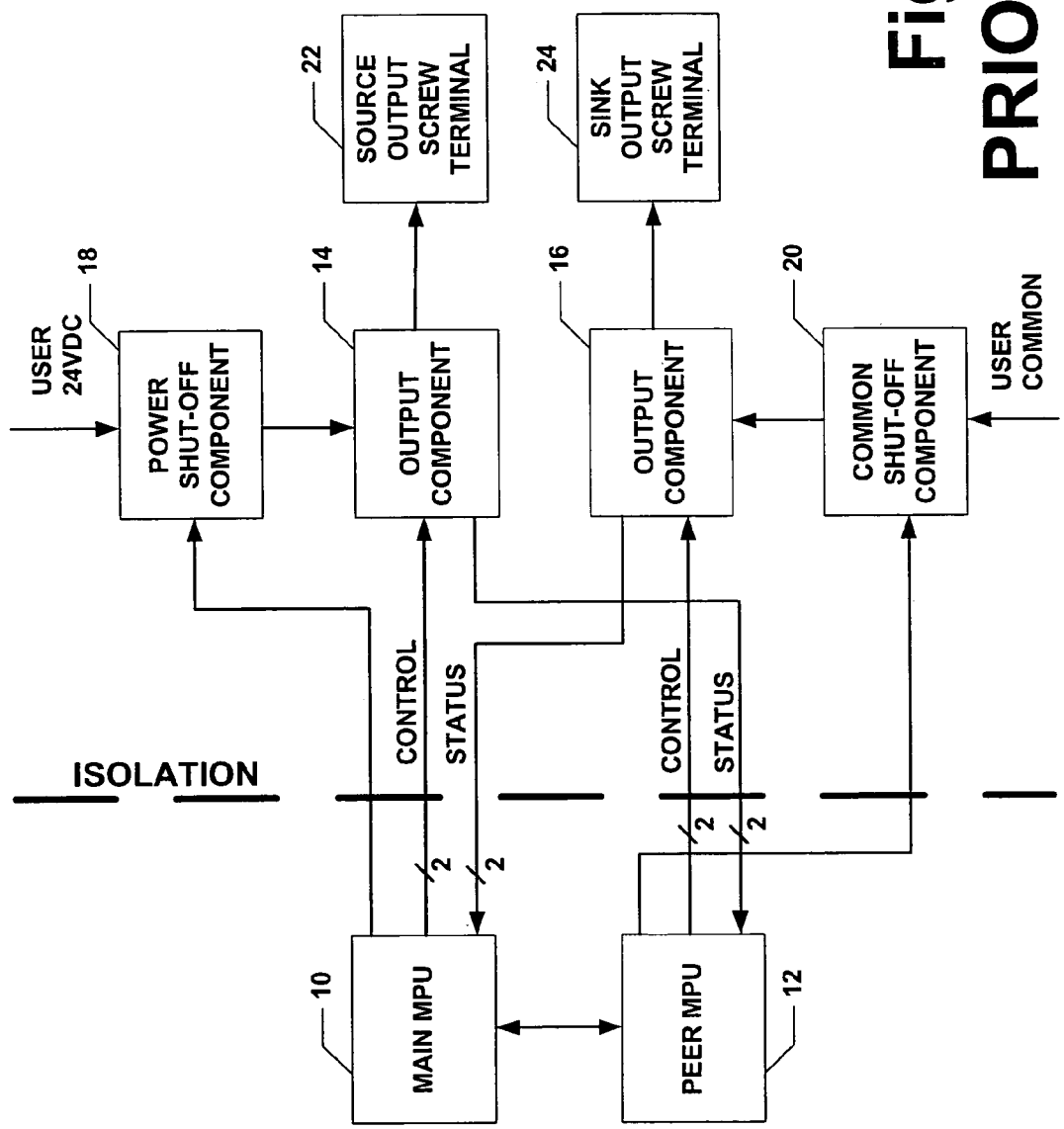
FIG. 1 illustrates a prior art industrial control system that employs a disproportionate number of isolators in relation to data channels.
Figure 2:
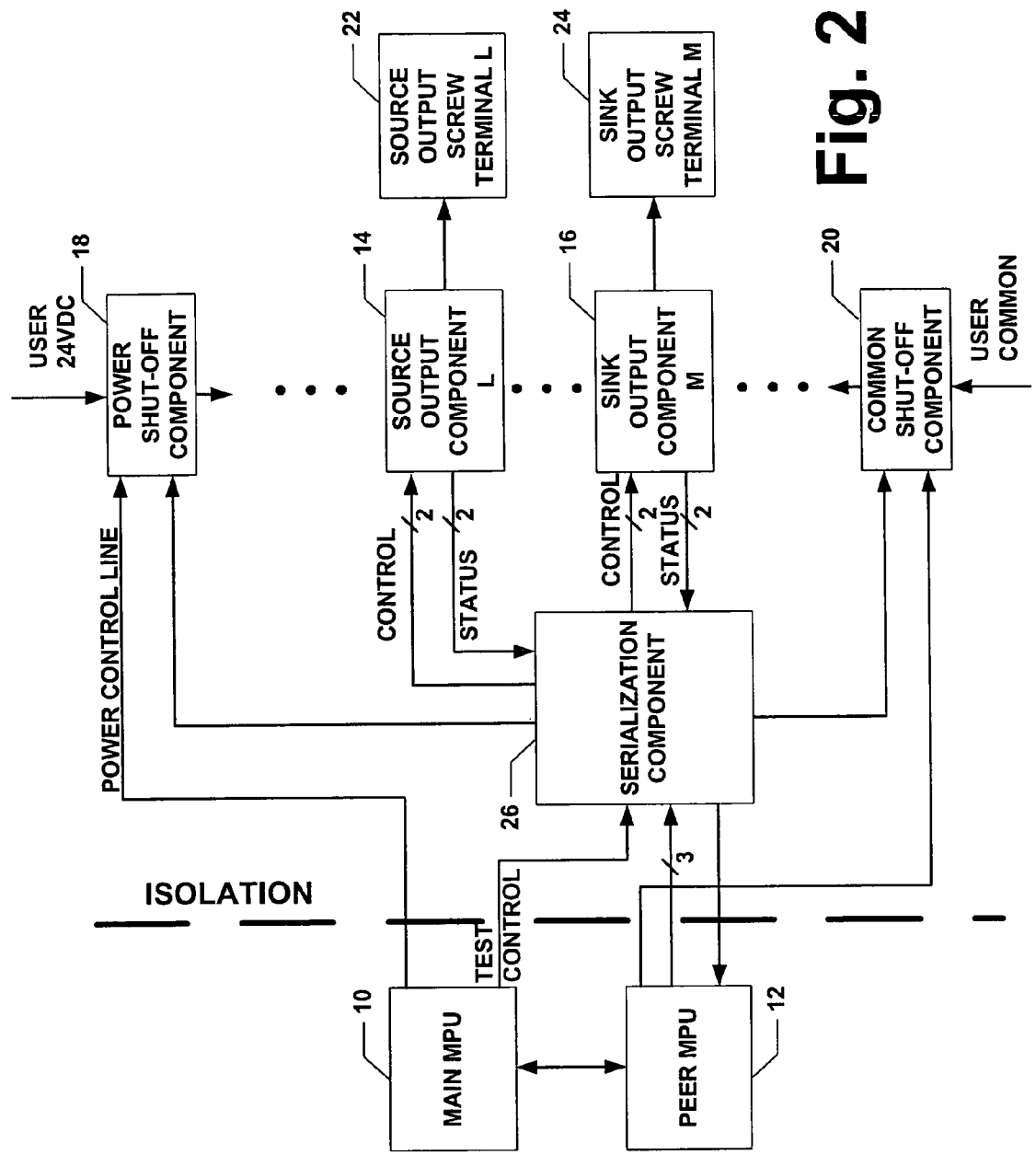
FIG. 2 illustrates an industrial control system that includes a serialization component that minimizes the number of isolation elements employed, in accordance with an aspect of the subject invention.

FIG. 2 illustrates an industrial control system that reduces the number of isolation elements in relation to the number of data channels. The main MPU 10 and peer MPU 12 are coupled to a serialization component 26, which communicates via a constant number (e.g., seven, five, etc.) of data lines. Thus, a control system with any number (four, eight, sixteen, etc.) of input and/or output channels would each require a constant number of data lines in the serial interface with an associated equal number of corresponding isolation elements. Thus, In this example, seven isolation elements are required for each of the seven data lines.

As shown, the source output component 14 can represent L number of source output components wherein L is an integer greater than or equal to zero. A corresponding L number of source output screw terminals 22 is illustrated. Similarly, the sink output component 16 can represent M number of source output components wherein M is an integer greater than or equal to zero. A corresponding M number of sink output screw terminals 24 is illustrated. Thus, any number L source outputs and/or M sink outputs can be employed with a constant number of data lines.

It is to be appreciated that the power shutoff component 18 can interface with one or more of the L source output components 14 and the common shutoff component 20 can interface with one or more of the M sink output components 16. Also, each of the L source output components 14 and M sink output components 16 can interface to the serialization component 26 via one or more control and/or status lines. Similarly, each of the L source output components 14 and M sink output components 16 can interface to their respective output screw terminals 22 and 24.

In one approach, the main MPU 10 processes actual (e.g., true) data and the peer MPU 12 processes the complement (e.g., inverse) of the actual data. In this example, the main MPU 10 outputs two data channels: a test control line and a power control line. The test control line is employed to ensure data transmitted to the serialization component 26 maintains desired data integrity (e.g., in compliance with a data quality standard, safety integrity level, etc.). The power control line is coupled to the power shut-off component 18, which can be employed to power down (e.g., de-energize) the output component 14. Such power down can occur when an error is detected in data such as when there is a mismatch between the true data (e.g., from the main MPU 10) and the complement data (e.g., from the peer MPU 12).

In this control system, the data I/O, control and status signals interface with the serialization component 26. Such an architecture is in contrast to conventional control designs wherein the data I/O, control and status signals communicate directly with the main MPU 10 and/or peer MPU 12. In this manner, the number of channels that require isolation to maintain data integrity is reduced to a constant value since the data I/O does not communicate directly with either the main MPU 10 or the peer MPU 12. In one embodiment, one or more isolation elements can be located between the serialization component 26 and the peer MPU 12.

In conventional systems, information is sent to one or more parallel ports from the main MPU 10. In contrast, information from the main MPU 10 is sent serially to the peer MPU 12. In order to insure proper data integrity, the true data received from the main MPU 10 can be combined with the complement data in the peer MPU 12. Such true and complement data can be cross-checked to verify that such data is in compliance with one or more data integrity and/or safety standards. In one example, data is transmitted and verified in compliance with a particular safety integrity level under IEC 61508. It is to be appreciated that substantially any desired data integrity standard can be employed. In addition, any number of data integrity verification methods can be employed. Such methods can include one or more of crosschecking the true data and compliment data, a cyclic redundancy check, checksum or a sequence count related to a local order of transmission of the data with respect to other data being transmitted, for example.

Figure 3:
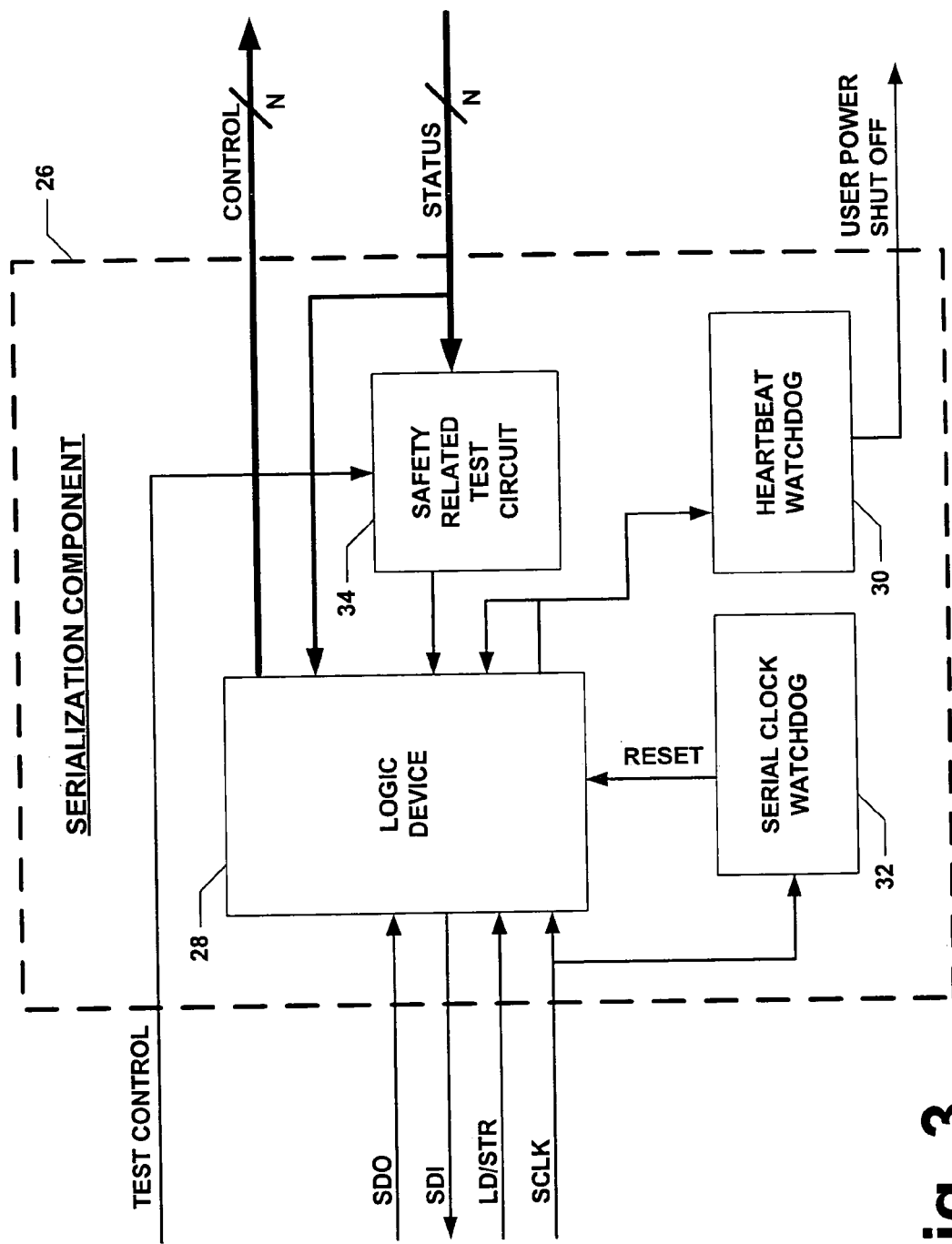
FIG. 3 illustrates the serialization component and related elements to insure data integrity is maintained throughout a transmission channel, in accordance with an aspect of the subject invention.

FIG. 3 illustrates the serialization component 26, which includes a logic device 28. Three diagnostic components, a heartbeat watchdog 30, a serial clock watchdog 32, and a safety related test circuit 34 can be employed to maintain data integrity associated with the logic device 28. The logic device 28 can receive data via a serial out channel, a load/store channel and a serial clock channel. Data can be sent from the logic device 28 to one or more processing components (not shown) via a serial in channel.

In one embodiment, the serial out channel sends data to the logic device 28 from a processing component, such as the peer MPU 12. The serial out channel can contain information formatted according to substantially any desired standard and/or protocol. Data can be transmitted via the serial out channel in association with the serial clock channel to insure the transfer of information is synchronized to prevent any false error conditions from occurring. Similarly, the serial in channel can transmit data in association with the serial clock channel.

In addition, the serial in channel can be employed to communicate from the logic device 28 to one or more components such as the peer MPU 12 and/or main MPU 10. In one approach, data is transmitted on the serial out channel and the serial in channel at substantially the same time (e.g., in accordance with full duplex serial communication). Further, such a substantially concurrent data transfer can occur in accordance with a signal from the serial clock channel.

The serial out channel can contain a data string that contains true and compliment data in a nibble, a byte, a word, a double word, a long word, a quad word and/or an N-length data string wherein N is an integer greater than or equal to one. A first portion of the data string includes the true data and a second portion includes the complement data. The serialization component 26 can verify that the true and complement data is correct. In one approach, the true and complement data is cross-checked wherein data is analyzed. If a desired result is obtained, data is propagated to one or more output registers. In contrast, if a desired result is not obtained, the serialization component 26 will not output the data.

Once receipt and/or transmission of the data string is complete, the serialization component 26 can send a pass/fail status signal back to a processing component (e.g., the peer MPU 12). Once the processing component receives the status signal, it can take a pre-determined action based at least in part upon the received status signal. In one example, a pass signal is received and no action is taken by the associated processing component (e.g., peer MPU 12). In another example, a fail signal is received and data is resent by one or more associated processing components (e.g., peer MPU 12). In one embodiment, data can be resent N number of times, where N is an integer greater than or equal to one.

In yet another example, a fail signal is received and power to the data I/O component (e.g., output component 14, 16, etc.) is shut down. Once power to the data I/O component (e.g., output component 14, 16, etc.) is shut off, outputs related to the data I/O component can be held in a safe state condition. A safe state condition can be predetermined and particular to each control architecture. In one control architecture, a safe state can de-energize one or more control outputs.

The heartbeat watchdog 30 can be employed to monitor specific data strings sent from the logic device 28. In one approach, a heartbeat bit is created by one or more processing components (e.g., main MPU 10, peer MPU 12, etc.) that communicate data to the logic device 28. The heartbeat bit can be verified to insure desired data integrity has been maintained. For example, one processing component (e.g., main MPU 10) can create a true heartbeat bit while another processing component (e.g., peer MPU 12) creates a complement heartbeat bit. Thus, in one example, during a predetermined time interval (e.g., update scan, output update scan, etc.) when a true data string contains a high heartbeat bit value, the complement heartbeat bit value must be low. This time interval can be determined by variables within firmware, software, etc. associated with the control system.

If the true and complement heartbeat bits do not have opposite values (e.g., true is 1 and the complement is 0 and vice-versa), the heartbeat watchdog 30 can communicate such a data integrity fault to the logic device 28. In addition, the heartbeat watchdog 30 can send a signal to turn power off to one or more output components (e.g., I/O terminals, power shut-off components, common shut-off components, etc.). Alternatively or in addition, the heartbeat watchdog 30 can place one or more outputs into a "safe state" condition based at least in part on a detected data integrity fault. Such "safe state" can be predetermined and can be specific to the type of system under control. It is to be appreciated that a safe state for one control application can be different than the safe state in another control application. Further, although control system outputs have been referenced, different signal types such as inputs, control signals, etc. are contemplated.

The serial clock watchdog 32 can be employed to monitor the frequency data is received by the logic device 28. In one example, a pre-determined scan value is employed wherein serial data is expected at least once every scan cycle. If data is not received within the pre-determined scan time, the serial clock watchdog 32 can send a reset signal to notify the logic device 28 that an error exists. Such error can be related to a communication failure from one or more hardware, software and/or firmware components responsible for providing data and/or facilitating data transfer to the logic device 28. Power to one or more output components can be turned off based at least in part upon the receipt of such reset signal.

The logic device 28 can read the heartbeat bit and one or more inputs and create true and compliment data based upon such received information. The logic device 28 can then send this data back to one or more processing components (e.g., peer MPU 12). The peer MPU 12 can check the true and compliment data sent by the logic device 28 and can perform a predetermined number of retries. In one approach, if the number of retries is exceeded, an associated first processing component (e.g., peer MPU 12) can shut off power to one or more data outputs. The first processing component (e.g. peer MPU 12) can copy the unaltered data from the logic device 28 to a second processing component (e.g., main MPU 10). In one example, the data in the first processing component and the second processing component is verified. Further, results from such verification can be cross communicated between the first and second processing components. If either processing component finds a discrepancy during such cross communication, power can be shut off to one or more data output components (not shown).

The safety related test circuit (SRTC) 34 can test safety related inputs received by the logic device 28. The SRTC 34 can insure that the input signals inside the logic device 28 are not internally falsifying the state of these inputs. The control of the SRTC 34 can be performed by an external processing component (e.g., main MPU 10) wherein the status of the SRTC 34 is communicated to one or more different processing components (e.g., peer MPU 12). In this manner, the one or more processing components can use this information to determine the correct state (e.g., 0 or 1) of the data.

Figure 4:
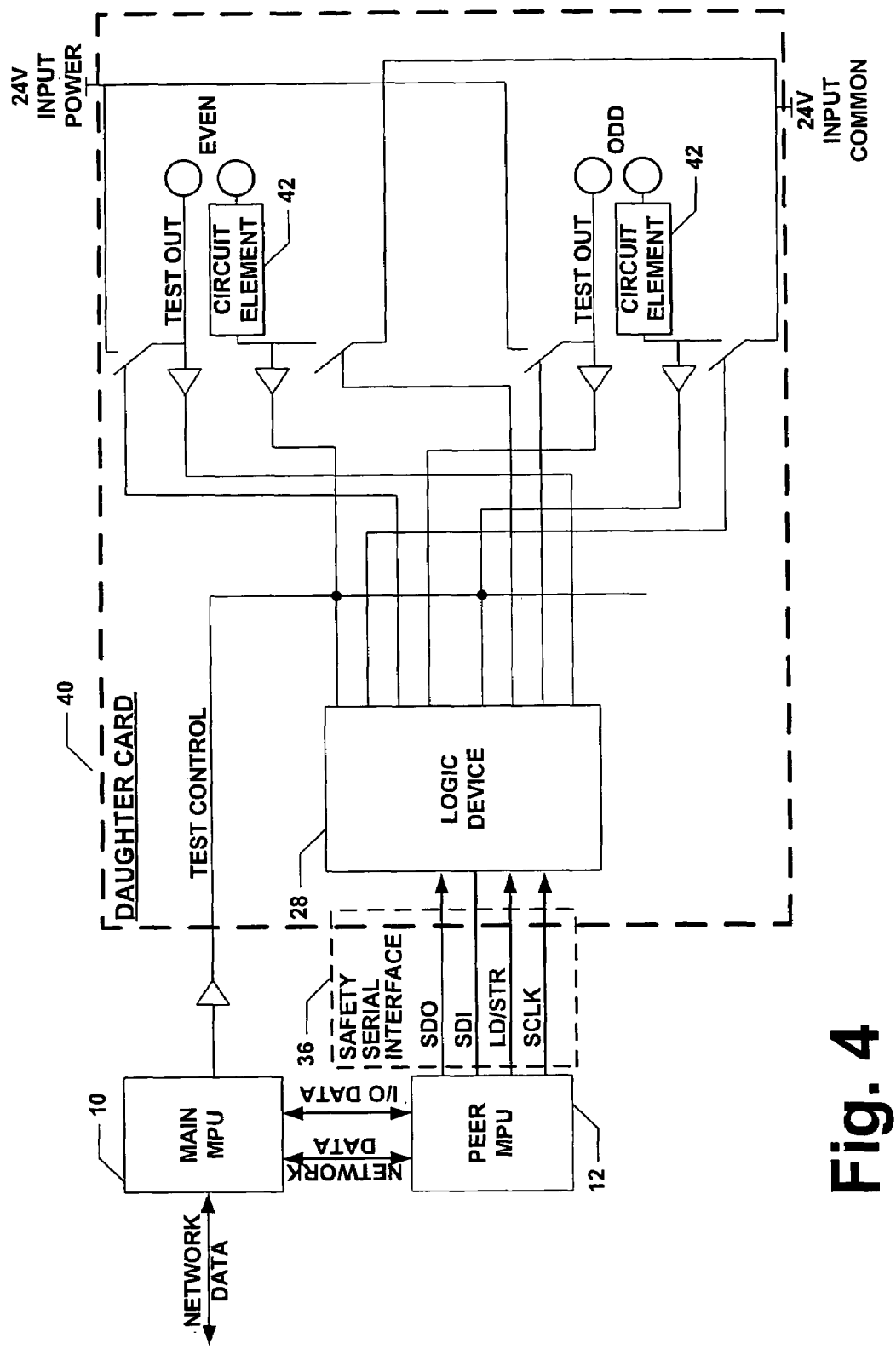
FIG. 4 illustrates the serialization component employed with an input data channel, in accordance with an aspect of the subject invention.
Figure 5:
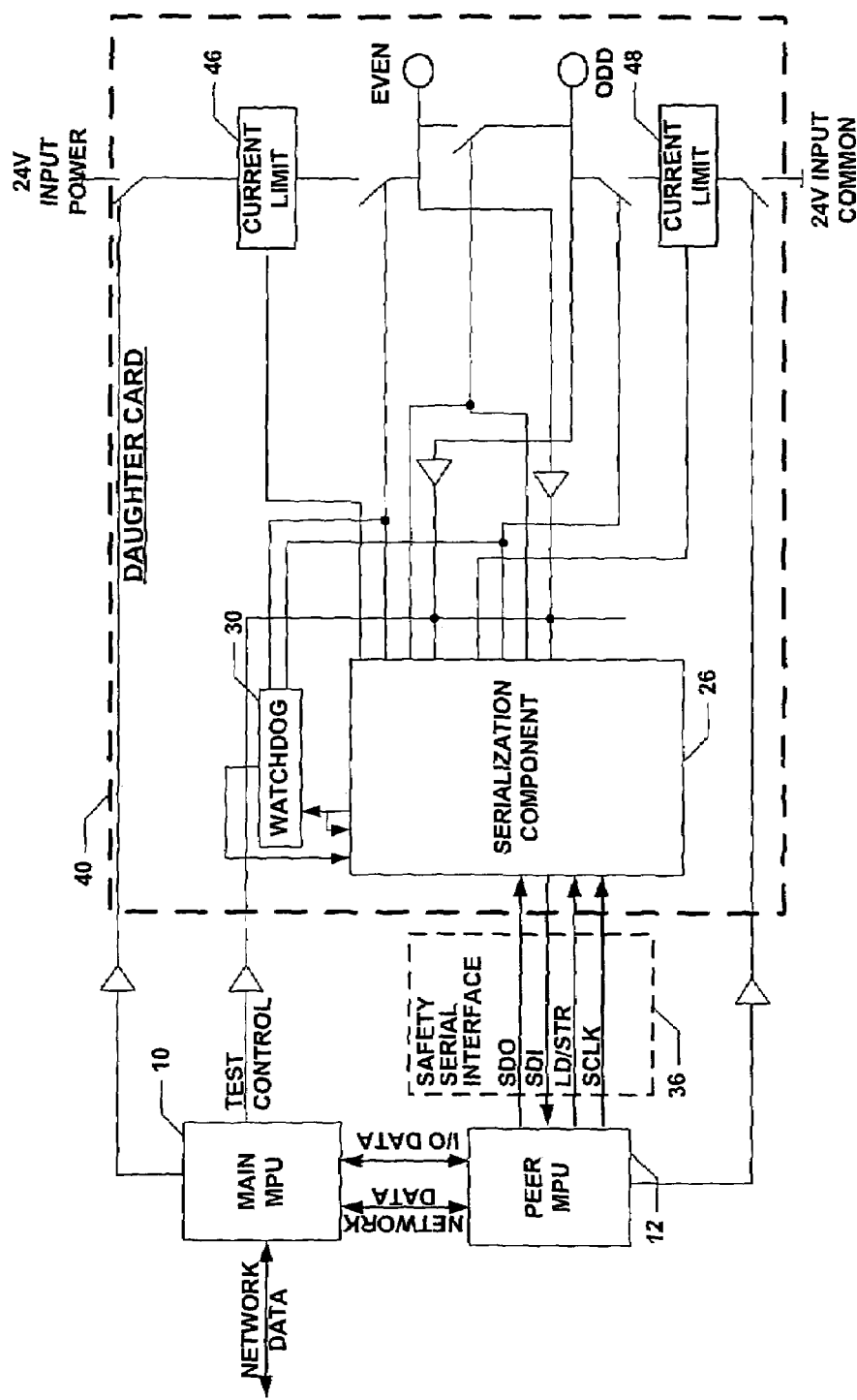
FIG. 5 illustrates the serialization component employed with an output data channel, in accordance with an aspect of the subject invention.

FIGS. 4 and 5 illustrate the serialization component 26 as a daughter card 40 within an exemplary control system. FIG. 4 shows the daughter card 40 in an input control system, whereas FIG. 5 illustrates the daughter card in an output control system. In one embodiment, the daughter card is associated with a programmable logic device or other machine control component. Data lines (SDO, SDI, LD/STR and SCLK), diagnostic lines and data test lines (TEST OUT) can communicate with the logic device 28 and/or daughter card 40. As long as received data is properly verified, the heartbeat is permitted to propagate and trigger the heartbeat watchdog 30.

The control system in FIGS. 4 and 5 can contain protective mechanisms to insure that transmitted and/or received data does not exceed pre-determined power limits, for example. FIG. 4 includes circuit elements 42 and 44 employed to set the input on and off thresholds. In this manner, excessive input power can be mitigated. Similarly, the control system illustrated in FIG. 5 contains current limit elements 46 and 48 to insure an over current condition does not exist with respect to one or more output channels.

Data can be communicated to and/or from the daughter card 40 via the peer MPU 12 and/or the main MPU 10. The daughter card 40 can include a logic device 28 that processes one or more input and/or output signal control lines. Although the logic device 28 is illustrated, any type of logic fabric is contemplated such as one or more discrete devices, ASICs, integrated circuits, processors, programmable logic devices, complex programmable logic devices, etc.

In one approach, the daughter card 40 is a single 4-point module that can communicate in tandem with one or more additional daughter cards (not shown) and/or a common processing component (e.g., main MPU 10, peer MPU 12, etc.). In another example, each daughter card is a processing component in a rack associated with a programmable logic controller (PLC). In yet another approach, each daughter card is an element within a modular I/O system. It is to be appreciated that the subject invention can include any number of daughter cards wherein each daughter card can process any number of bits.

As shown, the peer MPU 12 is responsible for sending and/or receiving data to the daughter card 40 wherein the peer MPU 12 can dedicate four groups of general purpose I/O port pins. These four groups of general purpose port lines are configured to create safety serial interfaces (e.g., safety serial interface (SSI) 36) via firmware. In other words, the peer MPU 12 can generate the serial signals on a bit-by-bit full duplex basis based at least in part on its firmware. The four ports can be configured to perform the following functions, wherein the "x" is indicative of the port:

| Signal | Description |
| --- | --- |
| SDO_x | Serial Data sent to the daughter card from Peer MPU |
| SDI_x | Serial Data received from the daughter card into Peer MPU |
| SCLK_x | Clocks shifts serial data into the daughter card and into Peer MPU |
| LD/STR_x | Initiates, enables and terminates a serial exchange by loading registers appropriately at its leading and trailing edges. |

The SSI 36 is a synchronous serial bi-directional data exchange for safety information. As noted, the SSI 36 can consist of four communication signals (SCLK (serial clock), SDO (serial data out), SDI (serial data in), and LD/STR (load/store)) and one test control signal. In one approach, data presented through the SSI 36 is arranged in the following manner: complement heartbeat, complement data, true heartbeat, true data. The heartbeat is a bit that is complemented on a periodic interval, presumably an integer multiple of the main I/O update task. It is not complemented on every serial access to the interface. In one embodiment, the complement data can be provided by the peer MPU 12, while the true data is provided by the main MPU 10.

The LD/STR signal can be active high to accommodate the de-energized primary state of an isolator. That is, when the isolator is powered down on its primary side, its output on the secondary side is low (e.g., the SSI 36 will be de-selected). The LD/STR signal is set active high before an exchange is to occur. Upon receipt of the first serial clock going high after LD/STR goes high, the inputs are sampled and the most significant bit (MSb) is put onto SDI. SDO is also asserted on this first serial clock.

SDO and SDI are updated on the rising edge of the serial clock and sampled on the falling edge of serial clock. Once all the bits have been exchanged, the LD/STR signal is de-asserted before the final serial clock, ending the frame. The final serial clock cycle stores the serialized data into the output register, which is presented to the output pins. Also on this final clock cycle, if a mismatch of the true/complement data is detected, the output register update will not occur and the SDI signal will be updated (high for a good compare of output data, low for an erroneous compare of data).

In one approach, the LD/STR signal is asserted one half cycle prior to the SCLK assertion to initiate serial transfer. Assertion of the SCLK loads input data into the logic device shift register. Assertion of the MSb of the output data is placed on the SDO line by the microprocessor (e.g., main MPU 10, peer MPU 12). The MSb of the output data is available on SDI from the logic device. The failing edge of the SCLK causes the logic device to read the SDO signal. A microprocessor reads the SDI signal substantially immediately after lowering the SCLK signal value.

Remaining data is sent over a serial channel (e.g., one channel per daughter card) wherein new values of SDO and SDI are presented on the rising edge of SCLK. Values on SDO and SDI are read on the falling edge of SCLK by the logic device and a microprocessor. LD/STR is de-asserted on the falling edge of the last serial data clock (e.g., immediately prior to bit 0 being read by the microprocessor). One last assertion of SCLK enables the status of the output transfer to be sent back on SDI (e.g., 0=failed, 1=good). If the status of the output transfer is good, the output data is stored into the output register (e.g., sent to the output pins). Otherwise, the output register is left unchanged. A microprocessor (e.g., main MPU 10, peer MPU 12) can clear the SCLK signal line wherein the LD/STR and SDO lines are already low. In addition, a microprocessor can read the status of an output recently performed (e.g., 0=failed, 1=good).

The test control signal can be utilized to differentiate safety inputs and read-backs from signals internal to the logic device 28 that could mask the true nature of the safety signals. It is also useful for uniquely associating the serial exchange to a daughter card's slot position. The test control signal (e.g., one for each slot), is asserted by a first processor (e.g., main MPU 10) when a test is to be performed and de-asserted (e.g., low) for normal transfers. In order to verify that a second processor (e.g., peer MPU 12) is communicating to the correct daughter card, a procedure at power up and at runtime can be performed. In one example, utilizing four daughter cards, the following commands can be initiated at power up:

a) assert heartbeat 0 and assert the test control to daughter card 0;
   b) assert heartbeat 1 and assert the test control to daughter card 1;
   c) assert heartbeat 2 and assert the test control to daughter card 2; and/or
   d) assert heartbeat 3 and assert the test control to daughter card 3.

There are four test control signals from the first processor (e.g., main MPU 10), so each can be asserted individually. The heartbeat may be set individually to each daughter card. After this power up test, the daughter cards can be identified to be connected to the correct serial channel of the second processor (e.g., peer MPU 12). During operation, the uniqueness of daughter card positions can be continually monitored. In one example, during runtime, the following commands can be initiated:

a) assert the heartbeat to daughter card 0 at t=0 ms;
   b) assert the heartbeat to daughter card 1 at t+1 ms;
   c) assert the heartbeat to daughter card 2 at t+2 ms; and/or
   d) assert the heartbeat to daughter card 3 at t+3 ms;
   e) repeat starting at a).

Figure 6:
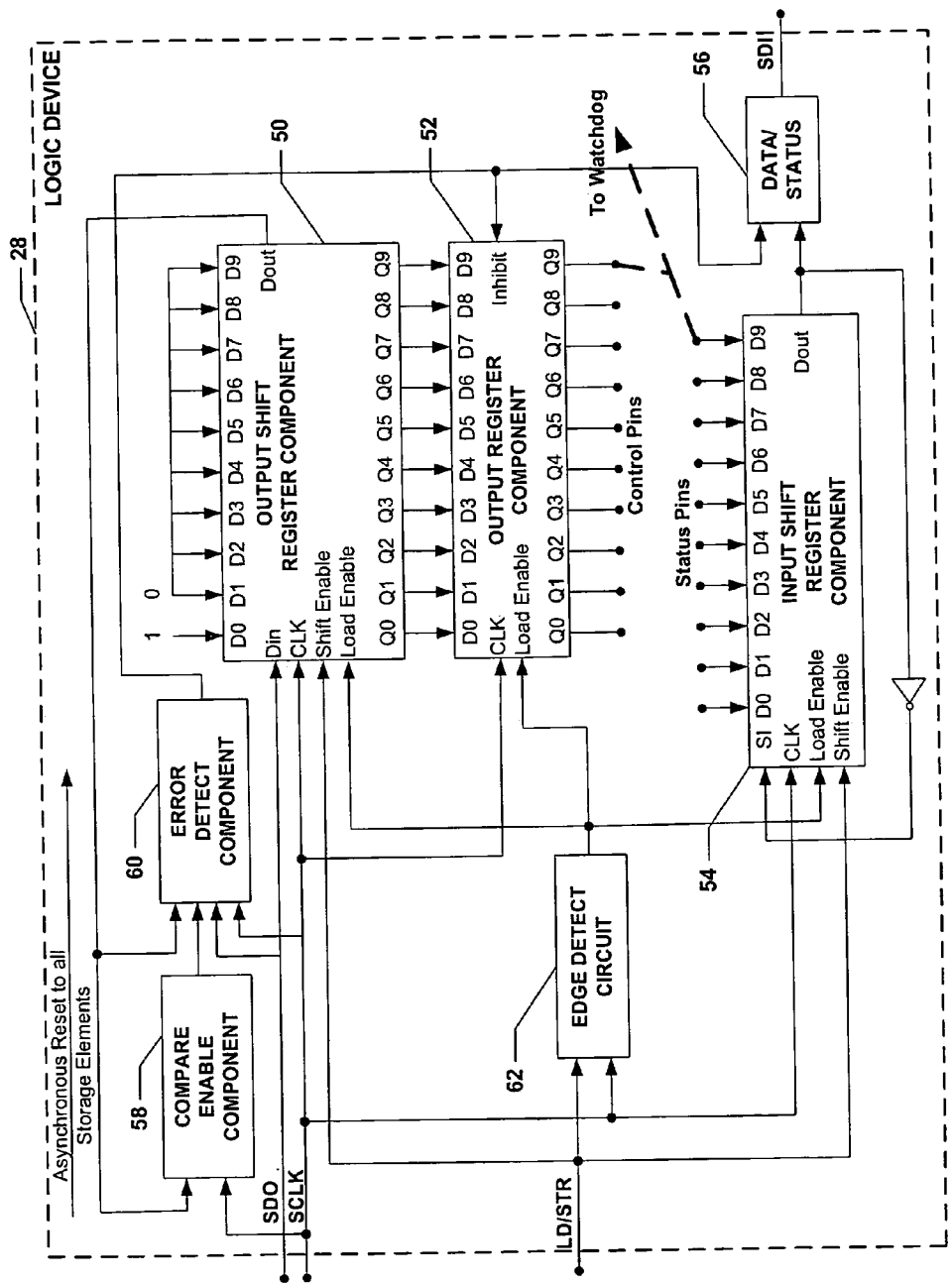
FIG. 6 illustrates the serialization component as a logic device, in accordance with an aspect of the subject invention.

FIG. 6 illustrates a particular exemplary embodiment wherein the serialization component 26 is a logic device 28 which receives data across an SDO (serial data output) line, a SCLK (serial clock) line and an LD/STR (load/store) line. Data can be output via an SDI (serial data input) line. An output shift register component 50 is coupled to an output register component 52. An input shift register component 54 transmits data via a data/status component 56 to the SDI line. A compare enable component 58 and an error detect component 60 are employed to monitor status of data associated with the logic device 28.

The SDO line protocol can consist of the peer MPU 12 shifting out a complement copy of the data followed by a non-complement (e.g., true) version of the data. Prior to shifting out this data, the output shift register 50 can be initialized by the high level of the LD/STR line and the first SCLK rising edge. The compare enable component 58, once LD/STR is high, watches for a particular (e.g., second, tenth, sixteenth) bit to exit the shift register. Once this occurs, it instructs error detect component 60 to compare the shift register data with the SDO. Whenever a mismatch is detected, a fault can be stored in a memory or equivalent device (not shown).

Figure 8:
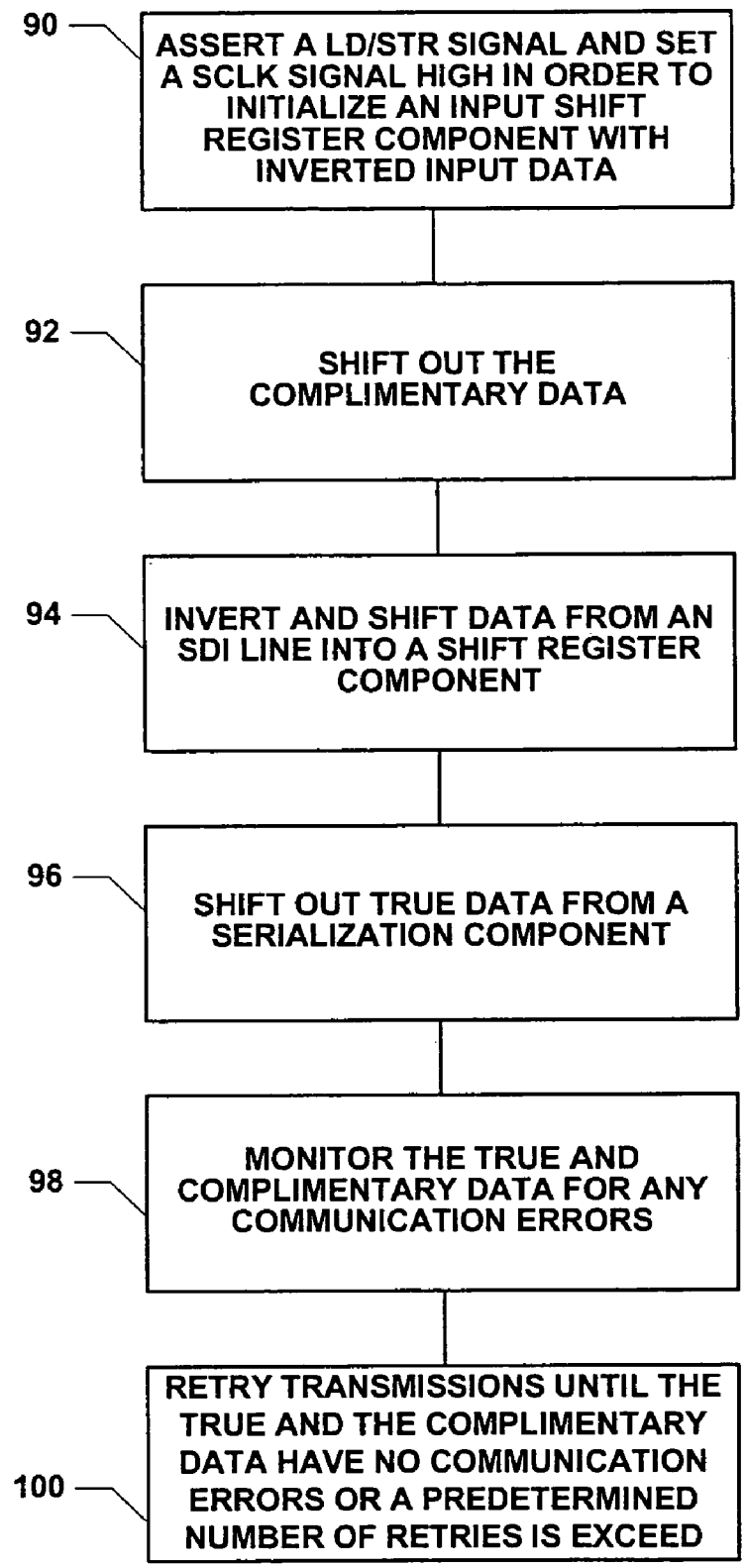

For purposes of simplicity of explanation, the methodologies of FIGS. 8 and 9 are shown and described as executing in sequence. However, it is to be appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Figure 7:
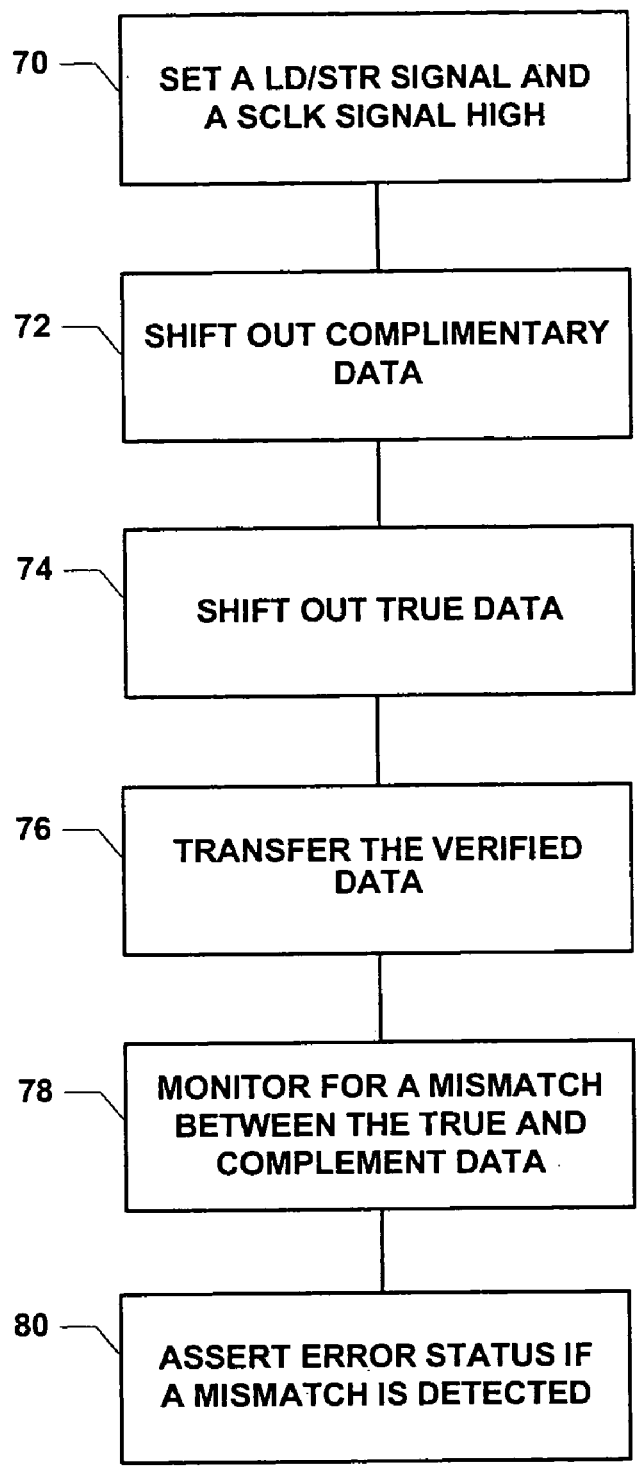
FIG. 7 illustrates a methodology for processing data related to the output of a serialization component, in accordance with an aspect of the subject invention; and, FIG. 8 illustrates a methodology for processing data related to the input of a serialization component, in accordance with an aspect of the subject invention.

FIG. 7 illustrates a methodology for processing data related to the output of a serialization component. At reference numeral 70, a processor initiates a transmission by setting a LD/STR signal high followed by setting a SCLK signal high. At 72, the processor shifts out complement data (e.g., for each bit, the processor outputs a serial bit and the SCLK high at the same time followed by lowering the SCLK signal). This data is shifted into the serialization component on the falling edge of the SCLK signal. At 74, the processor shifts out the true data. As this is done, the complement data loaded at 72 is compared to the arriving true data. At 76, the processor lowers the LD/STR signal followed by a SCLK to transfer the verified data in an output shift register component into an output register component. At 78, a mismatch between the true data and complement data is performed. If a mismatch of the true and complement data occurred on the transfer, the data in the output shift register component will not be loaded into the output register component. Should the processor receive information that status has failed on the SDI line, it will retry the transmission as necessary. At 80, an error status is asserted if a mismatch is detected.

FIG. 8 illustrates a methodology for processing data related to the input of a serialization component. At reference numeral 90, a processor asserts a LD/STR signal followed by setting a SCLK signal high in order to initialize an input shift register component with inverted input data. At 92, the serialization component shifts out the complement data. As this is being performed, at 94, the SDI line is inverted and shifted back into the input shift register component, thereby creating the true version of the serial pattern. At 96, the serialization component shifts out the true data. At 98, the processor checks the true and complement data for any communication errors. At 100, transmission of the true and complement data is retried until there are no communication errors or a predetermined number of tries is exceeded. In one approach, reference numerals 96 and 98 can occur at substantially the same time.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system that serializes control signals within a safety control architecture, comprising:
    a safety serial interface that at least one of receives and transmits signals from one or more processing components;
    a serialization component that receives and serializes at least one data packet from the safety serial interface to control at least one of an input and an output associated with the safety control architecture;
    a safety related test circuit that verifies input signals associated with the serialization component are not internally falsifying the state of the input signals; and
    a heartbeat watchdog component that verifies a true heartbeat bit in the at least one data packet is opposite a complement heartbeat bit in the at least one data packet within a predetermined time interval and shuts off power to at least one of an output and an input if the true heartbeat bit in the data packet is not opposite a complement heartbeat bit within the predetermined time interval.

2. The system according to claim 1, wherein the safety serial interface communicates with the serialization component on at least one of a serial device out line, a serial device in line, a load/store line, and a serial clock line.

3. The system according to claim 1, further including:
    at least one I/O component that at least one of transmits and receives data in a predetermined format based at least in part on data received from the serialization component.

4. The system according to claim 1, wherein the serialization component includes:
a logic device that reads the heartbeat bit and one or more inputs and creates true and compliment data based upon such received information.

5. The system according to claim 4, wherein the logic device sends data back to one or more processing components that check the true and compliment data sent by the logic device and attempt to resend the data a predetermined number of times.

6. The system according to claim 5, wherein if the number of retries is exceeded, a processing component shuts off power to one or more data outputs.

7. The system according to claim 1, wherein the heartbeat watchdog at least one of communicates a data integrity fault to the logic device, sends a signal to power off one or more output components, and place one or more components in a safe state condition if the heartbeat data does not have a true value opposite a complimented value within a predetermined time interval.

8. The system according to claim 1, further including:
a serial clock watchdog that compares the rate data is received by the logic device to a predetermined scan time.

9. The system according to claim 8, wherein a reset signal is sent from the serial clock watchdog to the logic device if the rate data is received is not within a predetermined scan time.

10. The system according to claim 1, wherein data integrity is verified by at least one of crosschecking the true data and compliment data, a cyclic redundancy check, checksum, and a sequence count related to a local order of transmission of the data with respect to other data being transmitted.

11. The system according to claim 10, wherein data is propagated to one or more output registers if data integrity is verified.

12. The system according to claim 1, further including:
a power shut off component that disables the power side of a power circuit based at least in part on the occurrence of a predetermined event; and
a common shut off component that disables the common side of a power circuit based at least in part on the occurrence of a predetermined event.

13. The system according to claim 1, wherein the at least one data channel is employed to communicate with the serialization component utilizing at least one of a test control line, a serial out line, a load/store line, a serial clock line, and a serial in line.

14. The system according to claim 13, further including:
an isolation component that isolates signals communicated across the test control line, the serial out line, the load/store line, the serial clock line, and the serial in line.

15. The system according to claim 14, wherein data transmitted on at least one of the serial in line and the serial out line is synchronized with the serial clock line.

16. The system according to claim 1, wherein the main MPU receives data from one or more sources via at least one of DeviceNet, ControlNet, EtherNet, EtherNet/IP, DeviceNet safety, ControlNet safety, EtherNet safety, EtherNet/IP safety and CAN protocol.

17. A module that serializes control signals within a safety control architecture, comprising:
a safety serial interface (SSI) that at least one of receives and transmits signals from one or more processing components;
a logic device that receives and serializes at least one data packet from the safety serial interface to control at least one of an input or an output associated with the safety control architecture; and
a heartbeat watchdog component that verifies a true heartbeat bit in the data packet is opposite a compliment heartbeat bit in the at least one data packet.

18. A programmable logic device that employs at least one of the modules according to claim 17.

19. The system of claim 18, wherein the heartbeat bit is asserted in each of the at least one modules at a predetermined time increment to identify each of the different at least one modules.

20. A method for processing data related to the output of a serialization component, comprising:
setting a load/store signal and a serial clock signal high via a first processor;
shifting out complimented data from the first processor on the falling edge of the serial clock signal;
shifting out true data from the first processor and comparing the true data to the compliment data;
transferring the verified data to an output shift register component into an output register component;
monitoring for a mismatch of between the true and the compliment data; and
serially transmitting the compliment input data followed by the true version of the data after verifying that no mismatch exists between the true and the compliment data.

* * * * *